F. L. BLOMQUIST.
SAW HANDLE.
APPLICATION FILED APR. 8, 1908.
913,462.
Patented Feb. 23, 1909.
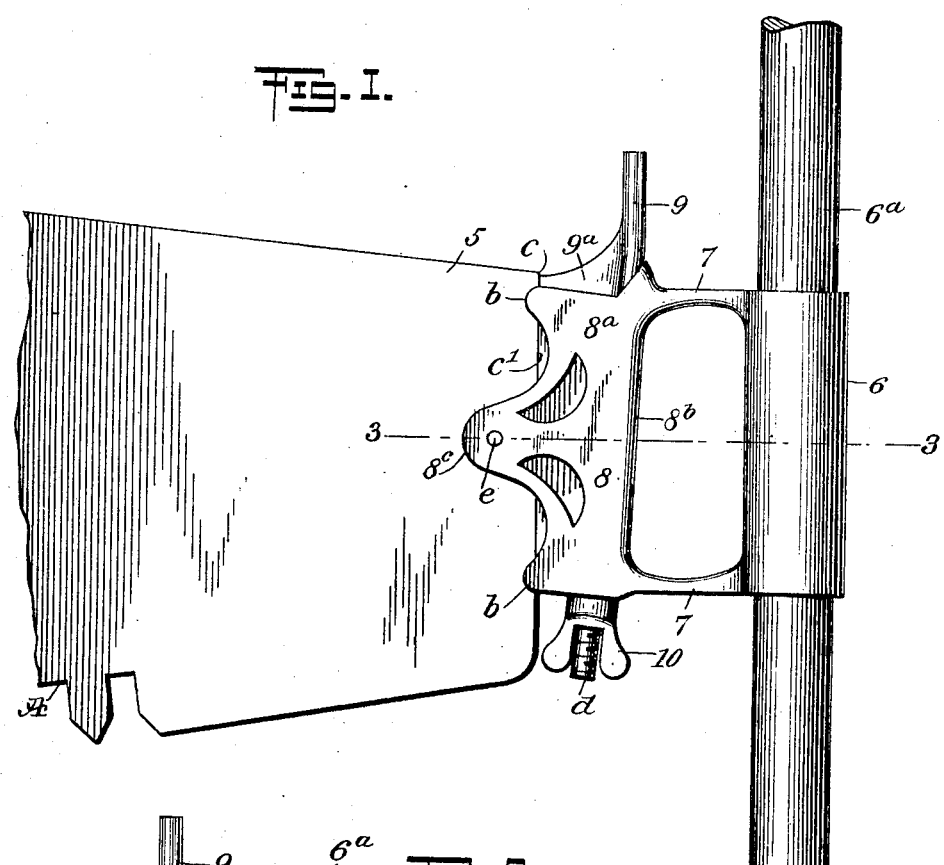
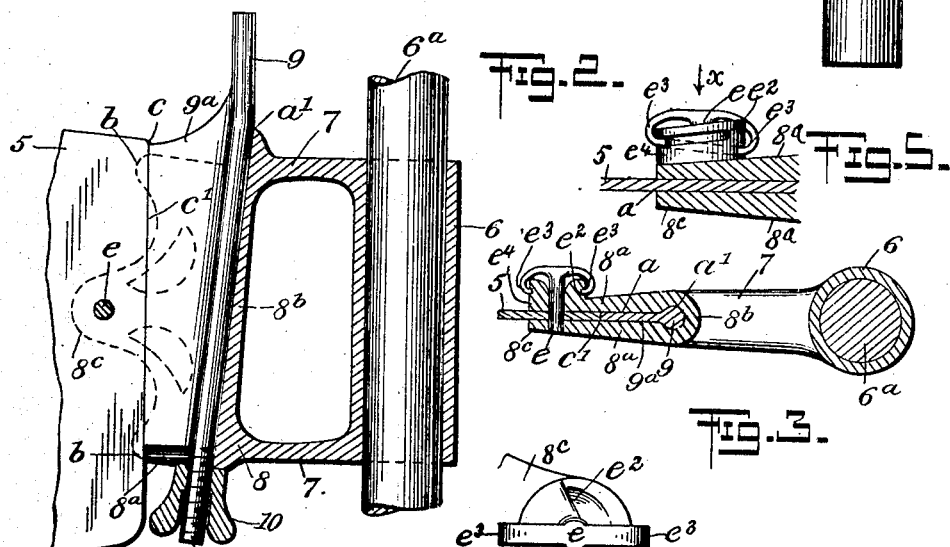
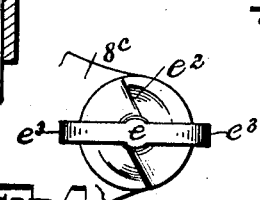
WITNESSES
INVENTOR
Frank L. Blomquist
BY
ATTORNEYS

UNITED STATES PATENT OFFICE.

FRANK LUDVIG BLOMQUIST, OF LA HONDA, CALIFORNIA.

SAW-HANDLE.

No. 913,462.

Specification of Letters Patent.

Patented Feb. 23, 1909.

Application filed April 8, 1908. Serial No. 425,921.

*To all whom it may concern:*

Be it known that I, FRANK L. BLOMQUIST, a citizen of the United States, and a resident of La Honda, in the county of San Mateo and State of California, have invented a new and Improved Saw-Handle, of which the following is a full, clear, and exact description.

This invention relates to saw handles of the detachable class, and has for its object to provide novel details of construction for a detachable saw handle, which afford an extremely simple, strong, light handle that may be readily mounted upon the heel of a saw blade, and be quickly secured thereon in a reliable manner, and be readily released and removed from the saw blade when occasion requires.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of the improved handle, secured upon the heel portion of a saw blade; Fig. 2 is a partly sectional side view of the improvement attached upon the heel of a saw blade, parts being shown in dotted lines; Fig. 3 is a transverse sectional view, taken substantially on the line 3—3 in Fig. 1; Fig. 4 is a view of a novel locking-pin, seen in the direction of the arrow $x$ in Fig. 5;
and Fig. 5 is a partly sectional side view showing the locking pin which appears in plan in Fig. 4.

The improved handle may be used in connection with saw blades of various sizes and different characters, it being equally well adapted for removable attachment upon a large rip saw or cross cut saw or a small hand saw, as may be desired, it being understood that the handle is proportioned in dimensions to that of the saw blade.

In the drawings, which represent the improved handle as mounted and secured upon the heel of a large saw blade such as are employed for ripping or cross cutting timber, A represents a saw blade of the character specified, and 5 the heel portion of the blade.

The improved saw handle is preferably formed of metal and comprises a preferably tubular grip piece 6 from the end portions of which extend two similar arms 7, 7, that merge at their extended ends into the end portions of a clip piece 8. The clip piece 8 is longitudinally slotted, as at $a$, and thus provided with two spaced walls or jaws $8^a$, that have parallel true adjacent surfaces, said walls being integrally connected together by a back wall $8^b$.

A tubular bore $a^1$ forms the rear defining wall of the slot $a$, and at the normally lower end of this bore the end surfaces of the jaws $8^a$ are rendered level and at right angles with the axis of the tubular bore. The parallel jaws $8^a$ are preferably formed with integral clamping members $8^c$ on their forward portions and also have guide lips $b$ formed at their upper and lower ends.

A locking key is an important detail and essentially consists of a cylindrical rib 9, from which laterally extends a flat body plate $9^a$, which is slidably fitted between the jaws $8^a$, the rib 9 in a like manner being fitted within the tubular passage or bore $a'$, so that these parts may be reciprocated in the slot and bore between the jaws $8^a$ of the clip piece 8.

The heel portion 5 of the saw blade A, shown to illustrate the application of the improvement, terminates in a true transverse edge $c$, and in mounting the handle upon the saw blade, the heel 45 is inserted between the clamping members $8^c$ and guide lips $b$ a distance which will permit the free front edge $c'$ of the clamping body plate $9^a$ to have contact with the edge $c$.

It will be seen in Fig. 2 that the edge $c'$ is inclined somewhat toward the normally lower end of the cylindrical rib 9, thus giving the body plate $9^a$ the form of a wedge, and upon said lower end a screw thread $d$ is formed, whereon a winged nut 10 is mounted.

Transversely in the spaced clamping members $8^c$, oppositely disposed perforations are formed, and in the heel of the saw blade A, a like perforation is made, which will register with the perforations in the members $8^c$ when the heel portion 5 of the saw blade A is fully inserted between the members $8^c$ and guide lips $b$, and the transverse edge $c$ of the heel piece has contact with the front edge $c'$ of the body plate $9^a$, the relative position of parts being shown in Fig. 2.

In the alined perforations above mentioned, a bolt $e$ is fitted for a slidable insertion therethrough, as is clearly shown in Fig. 3, and it will be seen in Figs. 3, 4 and 5, that a circularly edged boss $e^4$ is formed on one side of one clamping member $8^c$, concentric with the perforation therein, and in the periphery of said boss, a spiral channel $e^2$ is formed. The head of the bolt $e$, is formed with opposite wings $e^3$ that are curved outward, downward and inward, their free ends being adapted to traverse the channel $e^2$.

It will be seen that if the perforations in the clamping members $8^c$ and in the saw blade 5 are alined, the smooth body of the bolt $e$ may be inserted therein until the wings $e^3$ are entered in the outer terminal of the spiral channel $e^2$, whereupon by turning said bolt so as to cause the wings to traverse said channel toward its lower end, the bolt will become locked and the saw blade be secured between the clamping members $8^c$.

Preferably the channel $e^2$ is not extended through the outer end of the boss $e^4$ and the ends of the wings $e^3$ are bent so as to enter said channel at opposite points, which will prevent a removal of the bolt from the clamping members $8^c$.

To complete the attachment of the saw blade, this may be effected by adjusting the winged nut 10 so as to draw upon the body plate $9^a$, whereupon the depression of the latter will press the edge $c'$ thereof into forcible engagement with the edge $c$ of the heel of the saw blade, and firmly but removably secure the handle and saw blade together.

In the tubular grip piece 6, a handle bar $6^a$ may be fitted, to permit the use of both hands while operating the saw, this being advantageous if the saw blade A is employed for ripping or cross cutting logs or timber, and as usual in such saws, a handle is mounted upon each end thereof to enable two persons to manipulate the implement. It will be understood, however, that the application of the improvement is not restricted to large saws, as it may be applied to saws of any character, but if used on small hand saws, the handle piece $6^a$ may be dispensed with and the grip piece 6 alone be employed for the manipulation of the saw.

The improved bolt connection for attaching the saw blade upon the handle, is a very convenient and advantageous feature of the invention, as if the saw is used for cutting down standing trees, it is necessary, for safety, that the saw blade be instantly released from the handle at one end of the saw blade, and the saw be pulled out of the kerf, otherwise the saw blade will be broken, or if in an endeavor to release it, a serious accident to one or more of the saw jets may happen. To this end, the instant turning of the bolt $e$, will release the handle and permit the blade to be drawn out of the saw cut.

Having thus described my invention, I claim as new and desire to secure by Letters Patent:

1. A detachable saw handle, comprising a grip piece, two arms extended from the ends of the grip piece, spaced parallel jaws on the extended ends of said arms, means, whereby a saw blade may be secured between the jaws, a wedge-shaped key longitudinally adjustable between the parallel jaws, and means for adjusting said key.

2. A detachable saw handle, embodying a hollow grip piece, a handle bar fitted therein, two arms extended from the respective ends of the grip piece, two spaced parallel clamping jaws formed on the extended ends of the arms, means, whereby a saw blade may be secured between the said jaws, a locking key comprising a flat body plate, a cylindrical rib on one edge of the body plate, the rib and body plate having slidable engagement between the clamping jaws, said key being tapered edgewise by sloping the free edge of the body plate toward one end of the rib, said end being threaded, and a nut mounted thereon.

3. In combination, a saw blade, and a detachable handle therefor, said handle embodying a grip piece, two arms extended from the respective ends of the grip piece, two spaced and parallel clamping jaws integral with the extended ends of said arms, said jaws having opposite members on their free edges, a locking key comprising a flat body plate that is tapered on one edge, an integral rib formed on the opposite edge thereof, the rib and body plate being slidable between the clamping jaws, said rib having a thread on the end thereof toward which the tapered edge of the body plate converges, a winged nut on said threaded end, the saw blade and members of the clamping plates having opposite perforations therein, and a connecting bolt or the like occupying these alined perforations.

4. In a device of the character described, the means for connecting the heel of a saw blade with a handle, consisting in providing a pair of spaced jaws on the handle, said jaws having opposite perforations and the saw blade a single perforation that may be registered with those in the jaws, a boss on one of the clamping jaws having a perforation alined with that in the jaw, said boss having a spiral channel in its periphery, a bolt fitting in the alined perforations in the jaws and saw blade, and wings on the head of said bolt adapted to traverse the spiral channel and thus move the bolt in the alined perforations.

5. A saw handle, comprising a grip piece, jaws carried by the grip piece, means, whereby a saw blade may be secured between the jaws, and a wedge fitting between the jaws and adapted to engage the end of a saw blade to firmly lock the handle to the saw blade.

6. A saw handle, comprising a grip piece, jaws carried by the grip piece, means, whereby a saw blade may be secured between said jaws, a wedge fitting between the jaws and adapted to engage the end of a saw blade to firmly lock the handle to the saw blade, and means for locking the wedge in position.

7. A saw handle, comprising a grip piece, jaws carried by the grip piece and having registering apertures at their forward portions, a bolt in said apertures for securing a saw blade between the jaws, a wedge between the jaws and adapted to engage the end of the saw blade to lock it to the handle, and means for adjusting the wedge and locking it in position.

In testimony whereof I have signed my name to this specification in the presence of two subscribing witnesses.

FRANK LUDVIG BLOMQUIST.

Witnesses:
    J. C. WILLIAMSON,
    F. G. WILLIAMSON.